United States Patent
Gong et al.

(10) Patent No.: US 10,332,650 B2
(45) Date of Patent: Jun. 25, 2019

(54) CARBON-METAL COMPOSITE AND METHOD FOR PREPARING THE SAME

(71) Applicant: DONGJIN SEMICHEM CO., LTD., Incheon (KR)

(72) Inventors: Seon Yeong Gong, Gyeonggi-do (KR); Soo Yeon Lee, Gyeonggi-do (KR); Hyeonseong Choe, Gyeonggi-do (KR); Chongchan Lee, Gyeonggi-do (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 8 days.

(21) Appl. No.: 15/192,613

(22) Filed: Jun. 24, 2016

(65) Prior Publication Data

US 2016/0307660 A1    Oct. 20, 2016

Related U.S. Application Data

(63) Continuation-in-part of application No. PCT/KR2014/012613, filed on Dec. 22, 2014.

(30) Foreign Application Priority Data

Dec. 27, 2013 (KR) ................ 10-2013-0165075

(51) Int. Cl.
| | | |
|---|---|---|
| C01B 32/174 | (2017.01) | |
| B22F 9/24 | (2006.01) | |
| B82Y 40/00 | (2011.01) | |
| H01B 1/04 | (2006.01) | |
| C09D 5/24 | (2006.01) | |
| C09D 11/52 | (2014.01) | |
| C09D 167/00 | (2006.01) | |
| C09D 11/037 | (2014.01) | |
| C09D 11/10 | (2014.01) | |
| C09D 7/61 | (2018.01) | |
| C08K 3/08 | (2006.01) | |
| C08K 3/04 | (2006.01) | |

(52) U.S. Cl.
CPC .............. *H01B 1/04* (2013.01); *C09D 5/24* (2013.01); *C09D 7/61* (2018.01); *C09D 11/037* (2013.01); *C09D 11/10* (2013.01); *C09D 11/52* (2013.01); *C09D 167/00* (2013.01); *C08K 3/041* (2017.05); *C08K 3/042* (2017.05); *C08K 3/08* (2013.01)

(58) Field of Classification Search
CPC .. H01B 1/04; B82Y 40/00; B22F 9/24; C01B 32/174; C01B 32/168
USPC ............. 252/500, 506, 510, 512, 518.1; 427/376.6; 977/748
See application file for complete search history.

(56) References Cited

U.S. PATENT DOCUMENTS

2011/0081546 A1*  4/2011  Kim ............... B22F 1/0022
                                                428/372

FOREIGN PATENT DOCUMENTS

| CN | 102580715 A | * | 7/2012 | ............... B01J 23/06 |
|---|---|---|---|---|
| KR | 20060098784 A | * | 9/2006 | ............... B82B 3/00 |
| KR | 101093140 | | 12/2011 | |
| KR | 102012002426 | | 3/2012 | |
| KR | 102012008437 | | 7/2012 | |
| KR | 20120120995 A | * | 11/2012 | ........... C01B 32/184 |
| KR | 102012012099 | | 11/2012 | |
| KR | 20130000803 A | * | 1/2013 | ........... C01B 32/184 |
| KR | 102013000080 | | 1/2013 | |
| KR | 102013000510 | | 1/2013 | |
| WO | WO2013048095 A | * | 4/2013 | ............... B82B 3/00 |

OTHER PUBLICATIONS

Wang "Microwave-assisted one-pot synthesis of metal/metal oxide nanoparticles on graphene and their electrochemical applications." Electrochimica Acta 56 (2011) 3338-3344 (Year: 2011).*
Yamada "Synthesis of Carbon Nanotube/Silver Nanocomposites by Ultrasonication." Materials Transactions, vol. 51, No. 10 (2010) pp. 1769 to 1772 (Year: 2010).*
International Preliminary Report on Patentability and Written Opinion with English Language Translation, dated Jun. 28, 2016, Application No. PCT/KR2014/012613.

* cited by examiner

*Primary Examiner* — Tri V Nguyen
(74) *Attorney, Agent, or Firm* — Womble Bond Dickinson (US) LLP (57) ABSTRACT

The present invention relates to a carbon-metal composite and a method for preparing carbon-metal composite, and more particularly to a method for preparing carbon-metal composite, which: is capable of reducing graphene oxide; which is capable of decreasing the steps and the time for hybridization of graphene which is obtained from the reduction, graphene or carbon nanotube, with metal; which is done under mild condition and; also which is capable of lowering resistivity of the carbon-metal composite. The method for preparing the carbon-metal composite comprises the steps of: reacting a composition containing a carbon compound selected from a group consisting of graphene, graphene oxide and carbon nanotube, a metallic precursor, a reducing agent and a solvent; and removing solvent partially or wholly from the composition reaction-completed. Wherein the reducing agent is selected from a group consisting of ethylene glycol, diethylene glycol, 1,2-propylene glycol, triethylene glycol, tetraethylene glycol, 1,3-propylene glycol, glycerol, and mixtures thereof.

13 Claims, 3 Drawing Sheets
(3 of 3 Drawing Sheet(s) Filed in Color)

CARBON-METAL COMPOSITE AND METHOD FOR PREPARING THE SAME

TECHNICAL FIELD

The present invention relates to a carbon-metal composite and a method for preparing carbon-metal composite, and more particularly to a carbon-metal composite and a method for preparing carbon-metal composite, which: is capable of reducing graphene oxide; which is capable of decreasing the steps and the time for hybridization of graphene which is obtained from the reduction, graphene or carbon nanotube, with metal; which is done under mild condition and; also which is capable of lowering resistivity of the carbon-metal composite.

BACKGROUND ART

Graphene is a carbon crystal in two-dimensional sheet in which carbon atoms are connected in hexagonal honeycomb shape, and multiple plate-type graphene form graphite. Therefore, when the graphite is exfoliated, graphene consisting of a single or a plurality of layers is obtained in a plate form. Graphene is a material having both the metallic properties and the non-metallic properties. As the metallic properties, there are good electrical and good thermal conductivity, and as the non-metallic properties, there are high thermal stability and high chemical inertness. Graphene can be applied to various uses such as an electric device, battery, fuel cell, the refractory material. Also, graphene or graphite is oxidized to produce graphene oxide (GO, oxidized graphene) with excellent dispersity. A non-oxidized graphene can be made without oxidation by using physical energy. Binder is added to such a graphene or graphene oxide to form ink and paste which enables patterning.

On the other hand, while graphene oxide has good dispersity, it has poor electrical conductivity so that the application to fields requiring good electrical conductivity is difficult. Accordingly, a process for reducing graphene oxide or a process for hybridizing with metal is necessary. As conventional reduction methods of graphene oxide, there are a heating method in which graphene oxide is heated at high temperature of 100 to 450° C. or 160 to 200° C. (Korean Patent No. 10-1093140B, Korean Patent Unexamined Publication No. 10-2013-0005101A), and a method in which graphene oxide is reduced with hydrazine such as phenyl hydrazine iodide or phenyl hydrazine etc. (Korean Patent Unexamined Publication No. 10-2012-0024263A, 10-2012-0084373A). Conventionally in order to hybridize graphene or graphene oxide with metal, graphene and metallic precursor etc. are reacted (Korean Patent Unexamined Publication No. 10-2013-0005101A), or hydrazine is applied after mixing graphene and metallic precursor etc. However, in case where ink in aqueous solution is formed, due to the surface tension of water, the above-mentioned reduction of graphene oxide and hybridization of graphene with metal are suitable for casting coating, not suitable for pattern-printing. In addition, when printing ink or paste prepared with solvent having a low boiling point of 120 or less are used for roll to roll (R2R) printing and screen printing, drying phenomenon and surface tension make the patterning be difficult. Also, a conventional reducing agent, such as sodium borohydride ($NaBH_4$), borane, hypophosphite ($H_3PO_2$), citrate, hydrazine, etc. causes the high acidity of the carbon-metal composite to be harmful, and the use of aldehydes, saccharides (sugars), alcohol, polyols etc. results in low reduction rate and thus it is difficult to reduce the graphene oxide or metal oxide.

DISCLOSURE

Technical Problem

An object of the present invention is to provide a carbon-metal composite and a method for preparing carbon-metal composite capable of reducing graphene oxide with improved reduction method and decreasing the steps and the time for hybridization of graphene which is obtained from the reduction, carbon nanotube.

Another object of the invention is to provide a carbon-metal composite and a method for preparing carbon-metal composite having low resistivity and good patterning with improved hybridization of graphene or carbon nanotube with metal.

Technical Solution

In an embodiment for achieving the objects, the present invention provides a method for preparing carbon-metal composite comprising the steps of: reacting a composition containing a carbon compound selected from a group consisting of graphene, graphene oxide and carbon nanotube, metallic precursor, a reducing agent and a solvent; and removing the solvent partially or wholly from the composition reaction-completed, wherein the reducing agent is one selected from a group consisting of ethylene glycol, diethylene glycol, 1,2-propylene glycol, triethylene glycol, tetraethylene glycol, 1,3-propylene glycol, glycerol, and mixtures thereof. In addition, the present invention provides a carbon-metal composite comprising: a carbon compound selected from a group of consisting of graphene, graphene oxide and carbon nanotube; and a metal which is bonded to the carbon compound, wherein the size of the metal is 10 to 100 nm.

Technical Effects

The carbon-metal composite and method for preparing the carbon-metal composite uses a reducing agent and a metallic precursor so that not only graphene oxide and metal oxide can be reduced with the improved reducing method, but also the steps and the time for hybridization of graphene, graphene which is reduced from graphene oxide or carbon nanotube with metal can be decreased. Accordingly, there is no need to use a conventional reducing agent, hydrazine having toxicity and thereby it is possible to reduce the environmental pollution. In addition, in the present invention, the carbon-metal composite is formed by the improved hybridization of metal and carbon component using a reducing agent having high boiling point and metallic precursor, wherein carbon component is selected from a group consisting of graphene and carbon nanotube. Therefore, ink and paste having low resistivity and good patterning can be prepared.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

EXAMPLES

Hereinafter, the present invention will be described in detail.

The method for preparing carbon-metal composite comprises the steps of: reacting a composition containing a carbon compound selected from a group consisting of graphene, graphene oxide and carbon nanotube, a metallic precursor, a reducing agent and a solvent; and removing the solvent partially or wholly from the composition reaction-completed, wherein the reducing agent is one selected from a group consisting of ethylene glycol, diethylene glycol, 1,2-propylene glycol, triethylene glycol, tetraethylene glycol, 1,3-propylene glycol, glycerol, and mixtures thereof.

The carbon compound used in the method for preparing carbon-metal composite, is selected from a group consisting of grapheme, graphene oxide (GO) and carbon nanotube (CNT). The carbon atoms in the carbon compound is hybridized with metal to thereby form carbon-metal composite and then prepare inks or pastes. Though if graphene oxide is used, it is reduced by a reducing agent contained in the composition, Therefore, as the carbon compound, graphene oxide can be used equally to graphene or carbon nanotube. The amount of carbon compound is 0.01 to 50 wt %, specifically 0.05 to 40 wt %, more specifically 0.1 to 35 wt % with respect to total composition. When the amount of the carbon compound is less than the above-mentioned range, printed-film might have no electrical properties, and when the amount of the carbon compound is more than the above-mentioned range, it might be difficult to prepare inks or pastes. Meanwhile, as carbon nanotubes, single-walled carbon nanotube (SWNT) and multi-walled carbon nanotube (MWNT) can be employed.

The metallic precursor used in the method for preparing the carbon-metal composite of the present invention, is combined to carbon compound to constitute carbon-metal hybrid structure. In other words, metal being oxidized is dispersed into or attached to the surface of the carbon compound and then the reducing agent and heating step remove remaining components such as oxygen (O) atoms, so that only metal component is combined onto the surface of the carbon compound. Examples of the metallic precursor include metal oxide such as silver oxide ($Ag_2O$), etc., metallic stearate such as zinc stearate, aluminium stearate and magnesium stearate and mixtures thereof. It is most preferable to use mixtures of silver oxide and metal oxide other than silver oxide or metal stearate, rather than only silver oxide. The amount of metallic precursor is 0.01 to 50 wt %, specifically 0.05 to 40 wt %, more specifically 0.1 to 40 wt % with respect to total composition. When the amount of metallic precursor is less than the above-mentioned range, the resistivity of graphene may be increased, and when the amount of metallic precursor is more than the above-mentioned range, hybridization may be done partially and the cost for the hybridization may be increased. Also, when the metallic precursor is mixtures of silver oxide and metal oxide other than silver oxide or metallic stearate, the amount of metal oxide other than silver oxide or metallic stearate is 0.05 to 10 parts by weight, specifically 0.1 to 5 parts by weight, more specifically 0.5 to 5 parts by weight, with respect to 100 parts by weight of total metallic precursor. When the amount of metal oxide other than silver oxide or metallic stearate is less than the above-mentioned range, it shows effects similar to those occurring when only silver oxide is used. When the amount of metal oxide other than silver oxide or metallic stearate is more than the above-mentioned range, its viscosity may be excessively increased.

As to graphene, for example, among the carbon compounds, the conventional process for obtaining a graphene-metal composite using metallic precursors such as $AgNO_3$, AgCl and so on is comprised by bonding the metallic precursor to a functional group of the graphene (carboxylic acid, a hydroxyl group and so on) and then carrying out a reduction using a reducing agent such as hydrazine and so on, so that it is complicate and much time-consuming. In addition, remaining unreacted metal particles can be agglomerated so that agglomeration and non-uniformity of the graphene-metal composite can be caused. On the other hand, in the process for obtaining a graphene-metal composite according to the present invention, Ag ions are precipitated from the silver oxide ($Ag_2O$) and at the same time the graphene oxide is reduced, to form Ag particles. Therefore, the process for obtaining a carbon-metal composite according to the present is simple. Further the carbon-metal composite can be formed even if there is no functional group in the graphene. Accordingly, the method according to the present invention can be applied to non-oxide graphenes as well as graphene oxides. Since Ag particles are attached to the graphene at its surface direction (basal plane) and edge regardless of the attaching portion, by van der Waals force, Ag decoration for uniformly forming nano-sized dots or nano-particle layers is easy. In the present method, hybridization of the graphene-metal is achieved in one step, so that the process and time for the hybridization can be shortened.

In the present carbon-metal composite, in case where Ag is physically anchored or attached to prepare graphene, the size of Ag particle is 10 to 100 nm, specifically 20 to 100 nm, more specifically 20 to 80 nm. In preparing the carbon-metal composite, as size of the metal particles (filler) is smaller, an interparticle distance is reduced and a critical threshold (percolation threshold, %) is reduced. Therefore, in compared with the particles having size larger than the above-mentioned range, input of relatively little amount of particles exhibits excellent electrical properties, and when the particle size is 20 nm or less, by van der Waals forces, re-agglomeration between powders can be possibly caused during the manufacturing process.

The inks or pastes which are manufactured by the method for preparing carbon-metal composite according to the present invention are classified into, ESD (electro static discharge) and EMI (electromagnetic interference) shielding, When the inks or pastes for ESD (electro static discharge) are manufactured, the amount of the metallic precursor is 0.05 to 4 wt %, specifically 0.1 to 2 wt % with respect to total composition, and when the inks or pastes for EMI shielding are manufactured, the amount of the metallic precursor is 5 to 50 wt %, specifically 10 to 40 wt % with respect to total composition.

The reducing agent of the present invention reduces the graphene oxide or removes oxygen atom excepting for metal component from the metallic precursor combined onto the carbon compound to reduce the carbon-metal composite. Examples of the reducing agent include ethylene glycol, diethylene glycol, 1,2-propylene glycol, triethylene glycol (TEG), tetraethylene glycol, 1,3-propylene glycol, glycerol and mixtures thereof, and specifically glycol-based material, more specifically TEG. The amount of the reducing agent is 0.5 to 20 wt %, specifically 1 to 20 wt %, more specifically 1.5 to 15 wt % with respect to total composition. When the amount of the reducing agent is less than the above-mentioned range, graphene oxide is not sufficiently reduced into graphene or remaining component including oxygen atom, excepting for metal component cannot be sufficiently removed from the metallic precursor so that the carbon-metal composite cannot be formed. When the amount of the reducing agent is more than the above-mentioned range, storability or printability of inks or pastes can be degraded.

The solvent used in the method for preparing the carbon-metal composite of the present invention, can be employed without limitation, as long as the solvent does not modify the carbon compound and the composition. Examples of the solvents include alcohol compounds such as methanol, ethanol, isopropyl alcohol, isobutyl alcohol etc., aromatic compounds such as benzene, toluene, etc., general cyclic compounds such as cyclohexane etc., ketone compounds such as acetone, methyl ethyl ketone (MEK), diethyl ketone, methyl isobutyl ketone (MIBK), etc., ether compounds such as diethyl ether, petroleum ether, tetra-butyl methyl ether, etc., furan compounds such as tetrahydrofuran, etc., pyrrolidine compounds such as N-methyl pyrrolidone (NMP) etc., amide compounds such as dimethyl formamide, etc., ester compounds such as ethyl acetate, etc., aromatic ester compounds such as benzyl acetate, etc., linear and/or branched hydrocarbon compounds such as dimethoxy ethane, 1-chlorobutane, etc., glycol ether (cellosolve) compounds such as ethyl cellosolve acetate, butyl cellosolve acetate (BCA) etc., water (H2O) and mixtures thereof. The amount of the solvent is 1 to 99 wt % with respect to total composition, and the amount of the solvent which dissolves the remaining composition except the solvent is sufficient.

Next, dispersing agents (or surface active agents) which can be further contained as needed, disperse and stabilize ingredients in composition used in the method for preparing carbon-metal composite of the present invention. The dispersing agents (or surface active agents) contains a functional group having affinity for metal in the metallic precursor. As the dispersing agents (or surface active agents), conventional dispersing agents (or surface active agents) can be used in single or mixed form without limitations. Examples of dispersing agents (or surface active agents) include hydroxyl carboxylic acid ester, Acrylate copolymer, modified polyether etc. The amount of the dispersing agent used in the method for preparing carbon-metal composite composition is 0.05 to 20 wt %, specifically 0.1 to 15 wt %, more specifically 0.15 to 10 wt % with respect to total composition. When the amount of the dispersing agent is less than the above-mentioned range, dispersity and storability may be degraded, and when the amount of the dispersing agent is more than the above-mentioned range, the electrical properties may be degraded.

In addition, binders which can be further contained as needed, make the inks or pastes manufactured by the method for preparing the carbon-metal composite according to the present invention, be thermoset at a temperature of 200° C. and less, and are for bonding onto a base material. The examples of binders include epoxy, polyester, polyvinyl, polyurethane, ethylene vinyl acetate, and melamine and mixtures thereof. The amount of the binder used in the present method for preparing carbon-metal composition, is 0.1 to 20 wt %, specifically 0.5 to 20 wt %, more specifically 1 to 10 wt % with respect to total composition. When the amount of the binder is less than the above-mentioned range, the bonding between the composition and the base material may be incomplete and when the amount of the binder is more than the above-mentioned range, the electrical properties of may be degraded.

After pouring the above-described components to a reactor (or agitator), the reaction is carried out by heating and stirring for 30 minutes to 3 hours, specifically 1 to 2 hours, at 100 to 180° C., specifically 120 to 160° C. Here, the heating and stirring can be performed in several steps. That is, it is not necessary to pour all the components of the composition including carbon compounds, metallic precursors, reducing agents and solvents, to the reactor at a time. For example, first the carbon compounds, reducing agents and solvents are poured to the reactor and then heating/stirring is carried out, and thereafter the metallic precursor is added to the reactor and second heating/stirring is performed. After the completion of the heating/stirring, the part or all of the solvent contained in the composition is removed with solid-liquid separation using a centrifugal separator (If necessary, a reducing agent may also be removed), to thereby produce the carbon-metal composite which is the hybrid of metal and carbon compound selected from a group consisting of graphene and carbon nanotube.

According to the method for preparing carbon-metal composite of the present invention, the carbon-metal composite may be produced in form of powders, inks or pastes. In case of manufacturing the composite in form of powders, after the reaction completion by heating/stirring, to make the composite dry state having no moisture, all solvents should be removed from the composite (solvents might not be completely removed due to high specific surface area of the graphene), and then heating with a vacuum oven whose temperature is set at 20 to 50° C., specifically 30 to 40° C., is performed for 1 to 4 hours, specifically 2 to 3 hours, and the drying can be naturally carried out at room temperature in non-vacuum, considering the economic efficiency.

In case of manufacturing the composite in form of inks or pastes, binder should be added to in the composition used for the method for preparing carbon metal composite of the present invention. After the reaction completion by the above-mentioned heating/stirring, parts of solvents are removed from the composite containing the binder. The amount of solvents to be removed is variable, and is determined by considering viscosity of the inks or pastes to be manufactured. Thereafter, materials of a large number of grains (for example, beads) which can finely crush the remaining composition are added to and the remaining composition was grinded for 20 to 120 minutes, specifically 30 to 60 minutes with a milling, to be dispersed and thereby produce inks or pastes. As an alternative for manufacturing the inks or pastes, the powers manufactured by the method for preparing carbon-metal composite of the present invention can be used. In this case, the solvent which is contained in the composition used in the method for preparing carbon-metal composite of the present invention is added (if necessary, the dispersing agent can be further added), and the solvent added and the powders are reacted. Subsequent manufacturing processes are the same as when preparing the above-described inks or pastes.

Hereinafter, the present invention will be described in more detail through specific examples. The following examples are intended to illustrate the invention, not limited to this embodiment the present invention.

[Manufacturing Examples 1~4] Manufacturing Powders Using a Method for Preparing Carbon-Metal Composite After pouring graphene oxide of 3 wt % aqueous solution (Angstron Materials Inc., USA), a solvent of 1-methyl-2-pyrrolidone (Samchun chemical Co., Ltd., Korea), a reducing agent of triethylene glycol (TEG, Samchun chemical Co., Ltd., Korea) and a dispersing agent (DISPERBYK®-192, BYK-chemie Gmbh, Germany) to a reactor, the reaction was performed by heating and stirring for approximately 10 minutes at temperature of 120° C. and the stirring speed of 300 rpm. After the reaction completion, metallic precursors of $Ag_2O$ (Kojima chemical Co., Ltd., Japan) and aluminium stearate (Daejung Chemicals and Metals Co., Ltd., Korea) were added and next the reaction was performed by heating and stirring for 2 hours at temperature of 120° C. and the stirring speed of 300 rpm. After the stirring completion, solid-liquid separation was performed with a centrifugal separator (supra 30 k, HANIL industrial science Inc., Korea) at a speed of 20,000 rpm to remove supernatant and then, the composition was dried for 3 hours in a vacuum oven (OU-11, JEIO tech Co., Ltd., Korea) whose temperature is set at 30° C., to produce the powers manufactured by the method for preparing carbon-metal composite (Manufacturing Example 1). The components and amounts thereof used in Manufacturing Example 1, Manufacturing Example 2 in which powders are produced without Al stearate in comparison with Manufacturing Example 1, Manufacturing Examples 3 and 4 in which powers are produced without adding the reducing agent and/or metallic precursors, are shown in following Table 1.

TABLE 1

| | graphene oxide aqueous solution (wt %) | | 1-methyl-2-pyrrolidone (wt %) | TEG (wt %) | BYK-192 (wt %) | $Ag_2O$ (wt %) | Al stearate (wt %) |
|---|---|---|---|---|---|---|---|
| | graphene oxide | $H_2O$ | | | | | |
| Manufacturing Example 1 | 0.5 | 16.2 | 52.1 | 10 | 0.1 | 10 | 1 |
| Manufacturing Example 2 | 0.5 | 16.2 | 63.2 | 10 | 0.1 | 10 | |
| Manufacturing Example 3 | 0.5 | 16.2 | 83.3 | — | — | — | — |
| Manufacturing Example 4 | 0.5 | 16.2 | 73.3 | 10 | 0.1 | — | — |

[Examples 1 and 2, Comparative Examples 1, 2] Manufacturing Inks by Using the Method for Preparing Carbon-Metal Composite Powders manufactured in the Manufacturing Example 1 and 800 ml of distilled water were added to a flask and then heated to 80° C. Thereafter, a binder, solvents of methyl isobutyl ketone (MIBK, Samchun chemical Co., Ltd., Korea), methyl ethyl ketone (MEK, Samchun chemical Co., Ltd., Korea), propylene glycol monomethyl ether acetate (PGMEA, Samchun chemical Co., Ltd., Korea), and a dispersing agent (DISPERBYK®-192, BYK-chemi Gmbh, Germany) were added to the reactor and then stirred for 30 minutes at 2,000 rpm. The binder was made by inputting to a reactor 200 g of polyester binder (SK Chemicals Co., Ltd., Korea) over three times and stirring for 2 hours (herein the stirring time starts from the final third input of the binder). The predetermined amount of binder manufactured was put in an aluminium dish and its weight before and after drying was measured to check whether it gets intended weight. Next, zirconia beads were input into a stirring-completed solution and dispersed for 40 minutes with a disperser (DAS-200, LAU Gmbh, Germany), to prepare the inks manufactured by the method for preparing carbon-metal composite (Example 1). The powders in Example 2, Comparative Example 1 and 2 were manufactured in the same manner as in Example 1 except for using a different kinds of powders (Manufacturing Examples 2, 3 and 4) from that used in the Example 1. The components and amounts thereof used in Examples 1 and 2, Comparative Examples 1 and 2 are shown in following Table 2.

TABLE 2

| | Powder | Binder (wt %) | MIBK (wt %) | MIEK (wt %) | PGMEA (wt %) | Dispersing agent (wt %) |
|---|---|---|---|---|---|---|
| Example 1 | Manufacturing Example 1 (1 wt %) | 14 | 24.5 | 40 | 20 | 0.5 |
| Example 2 | Manufacturing Example 2 (1 wt %) | 14 | 24.5 | 40 | 20 | 0.5 |
| Comparative Example 1 | Manufacturing Example 3 (1 wt %) | 14 | 24.5 | 40 | 20 | 0.5 |
| Comparative Example 2 | Manufacturing Example 4 (1 wt %) | 14 | 24.5 | 40 | 20 | 0.5 |

Figure 1:
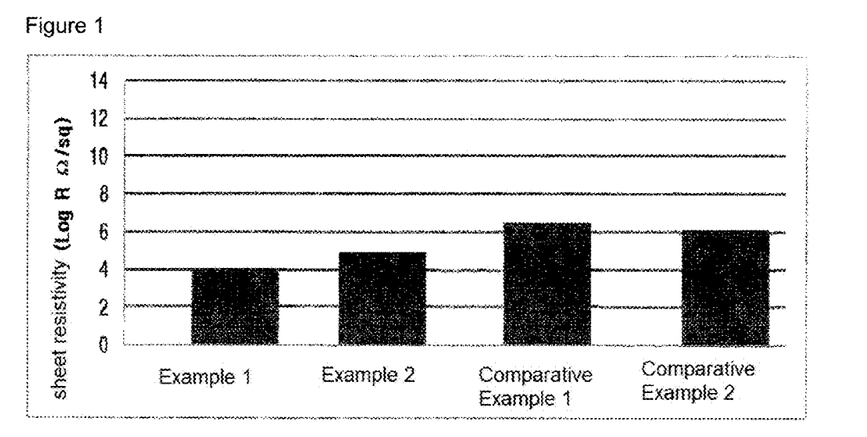
FIG. 1 illustrates graphs showing sheet resistivity of ink of one example prepared with a method for preparing carbon-metal composite according to the present invention and inks of comparative examples.
Figure 2:
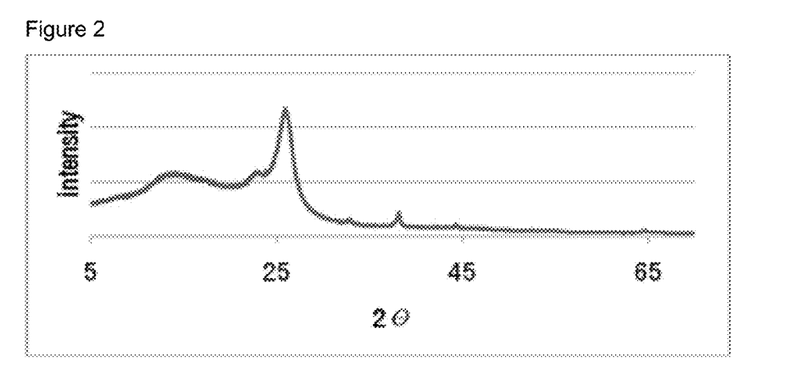
FIG. 2 illustrates a XRD (x-ray diffractometer) analysis graph of the film produced by the method of the carbon-metal composite in accordance with one embodiment of the present invention.
Figure 3:
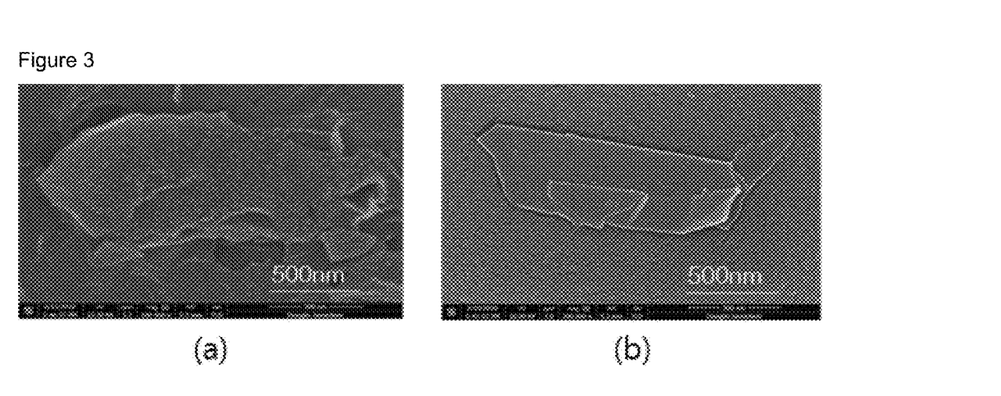
FIG. 3 illustrates SEM (Scanning Electron Microscope) pictures of the films produced by the method of the carbon-metal composite in accordance with one embodiment of the present invention and Comparative Example 2.

[Examples 1 and 2, Comparative Examples 1, 2]
Test of Electrical Properties of Inks Manufactured by the Method for Preparing Carbon-Metal Composite After coating the inks in Examples 1 and 2 and Comparative Examples 1 and 2 on the polyethylene terephthalate (PET) film with an automatic film applicator, the ink films were dried in a hot-air oven whose temperature is set to 160° C. (OF-22, JEIO tech Co., Ltd., Korea) for 30 minutes and then sheet resistivity thereof were measured with a surface resistivity meter (ST-4, Simco-icon, Japan). FIG. 1 illustrates graphs showing sheet resistivity of ink of an example prepared with a method for preparing carbon-metal composite according to the present invention and inks of comparative Examples. FIG. 2 illustrates a XRD analysis graph of the film produced by the method of the carbon-metal composite in accordance with one embodiment of the present invention, and FIG. 3 illustrates SEM pictures of the films produced by the method of the carbon-metal composite in accordance with one embodiment of the present invention and Comparative Example 2. The measurement result of sheet resistivity of inks in Examples 1 and 2, Comparative Examples 1, 2 are shown in following Table 3 and FIG. 1. In order to identify the component of the film in Example 1, using an XRD (x-ray diffractometer) X-ray was irradiated at a rate of 5°/min and its result is shown in FIG. 2. Using SEM (Scanning Electron Microscope, NOVA, S-400), the coating surface of films of Example 1 and Comparative Example 2 were photo-taken and results thereof are shown in FIG. 3.

TABLE 3

| | Sheet Resistivity (Ω/sq) |
|---|---|
| Example 1 | 4.06 |
| Example 2 | 4.95 |
| Comparative Example 1 | 6.58 |
| Comparative Example 2 | 6.22 |

As shown in Table 3 and FIG. 1, it can be seen that the ink (Example 1) containing both the reducing agent and the metallic precursor, which was made of the composition used in a method for preparing carbon-metal composite according to the present invention, has sheet resistivity lower than 30% and more, compared to the ink (Comparative Example 1) made of the composition without the reducing agent and the metallic precursor and the ink (Comparative Example 2) made of the composition made of the composition without the metallic precursor. Also, it can be seen that the sheet resistivity of ink in Example 1 is superior to that of ink (Example 2) made of composition without using the metal stearate.

As shown in FIG. 2, XRD analysis shows the peaks at 38 and 45° which is the peak point of Ag, from which it can be confirmed that Ag not silver oxide ($Ag_2O$) exists on the surface of the carbon components. That is, it can be predicted that the silver oxide added is decomposed by the heating, precipitated and finally reduced into Ag. As shown in FIG. 3, it can be confirmed that many Ag particles having 100 nm size or less are distributed at the surface of film in Example 1 ((a) of FIG. 3) while it is difficult to observe nano-sized particles at the film in Comparative Example 2 ((b) of FIG. 3).

[Examples 2 and 3, Comparative Example 3]
Manufacturing Pastes by Using the Method for Preparing Carbon-Metal Composite A metallic precursor of $Ag_2O$ (Kojima chemical Co., Ltd., Japan), a reducing agent of TEG (Samchun chemical Co., Ltd., Korea), a dispersing agent (Trademark: DISPER-BYK®-192, BYK-chemie Gmbh, Germany), solvents of butyl cellosolve acetate (BCA, Samchun chemical Co., Ltd., Korea), propylene glycol monomethyl ether acetate (PGMEA, Samchun chemical Co., Ltd., Korea) and binder used in the Examples 1 and 2 and Comparative Examples 1 and 2 (SK Chemicals Co., Ltd., Korea) were added to a reactor (or a stirrer) and then stirred for 10 minutes at 2,000 rpm. After the stirring completion, graphene (XG sciences, USA) and zirconia beads were added to the solution and dispersed for 40 minutes with a disperser (DAS-200, LAU Gmbh, Germany), to prepare the pastes manufactured by the method for preparing carbon-metal composite (Examples 3 and 4). The paste in Comparative Example 3 was manufactured in the same manner as in Examples 3 and 4 except for the metallic precursor and the reducing agent. The components and amounts of components used in Examples 3 and 4 and Comparative Example 3 are shown in following Table 4.

TABLE 4

| | Graphene (wt %) | Binder (wt %) | BCA (wt %) | PGMEA (wt %) | Dispersing agent (wt %) | TEG (wt %) | Ag$_2$O (wt %) | Al stearate (wt %) |
|---|---|---|---|---|---|---|---|---|
| Example 3 | 10 | 15 | 30 | 16.7 | 3 | 5 | 20 | 0.3 |
| Example 4 | 10 | 15 | 30 | 6.7 | 3 | 5 | 30 | 0.3 |
| Comparative Example 3 | 10 | 15 | 30 | 41.7 | 3 | — | — | 0.3 |

Figure 4:
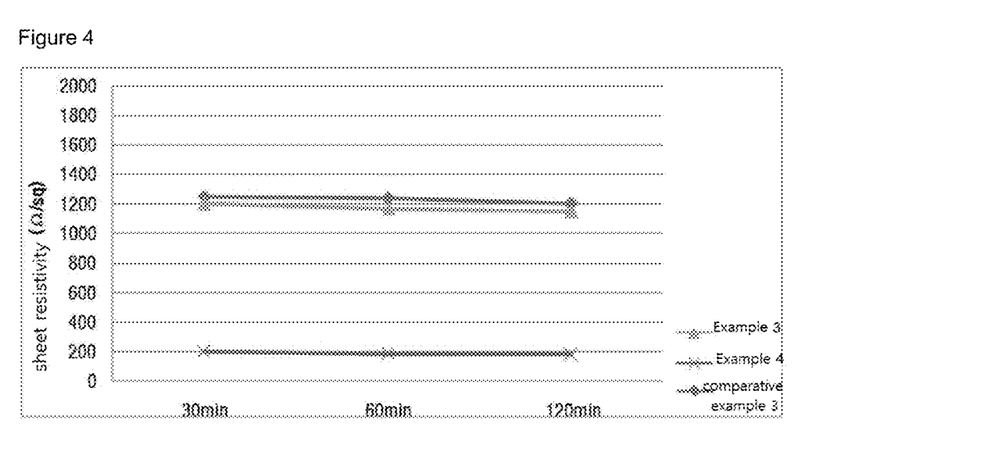
FIG. 4 illustrates graphs showing sheet resistivity of pastes of examples prepared with a method for preparing carbon-metal composite according to the present invention and paste of comparative example.

[Examples 3, 4, Comparative Example 3] Test of Electrical Properties of Pastes Manufactured by the Method for Preparing Carbon-Metal Composite After printing the pastes of Examples 3, 4 and Comparative Example 3 on the polyethylene terephthalate (PET) film with a bar coater, the ink films were dried in a hot-air oven whose temperature is set to 160° C. (OF-22, JEIO tech Co., Ltd., Korea) for 30 minutes, 60 minutes and 120 minutes and then sheet resistivity thereof were measured with a surface resistivity meter (Loresta-GP, Mitsubishi chemical Co., Ltd., Japan). FIG. 4 illustrates graphs showing sheet resistivity of pastes of examples prepared with a method for preparing carbon-metal composite according to the present invention and paste of comparative Example. The measurement result of sheet resistivity of pastes in Examples 3, 4, and Comparative Example 3 are shown in following Table 5 and FIG. 4.

TABLE 5

| | Sheet Resistivity (Ω/sq) | | |
|---|---|---|---|
| | 30 minutes | 60 minutes | 120 minutes |
| Example 3 | 1,200 | 1,170 | 1,150 |
| Example 4 | 200 | 180 | 175 |
| Comparative Example 3 | 1,250 | 1,240 | 1,200 |

As shown in Table 5 and FIG. 4, it can be seen that the pastes (Examples 3 and 4) containing both the reducing agent and the metallic precursor, which was made of the composition used in a method for preparing carbon-metal composite according to the present invention, has sheet resistivity lower than the paste (Comparative Example 3) made of the composition without the reducing agent and the metallic precursor. Also, it can be seen that, compared to Example 3, the sheet resistivity in Example 4 in which higher amounts of metallic precursor are used is significantly low.

Figure 5:
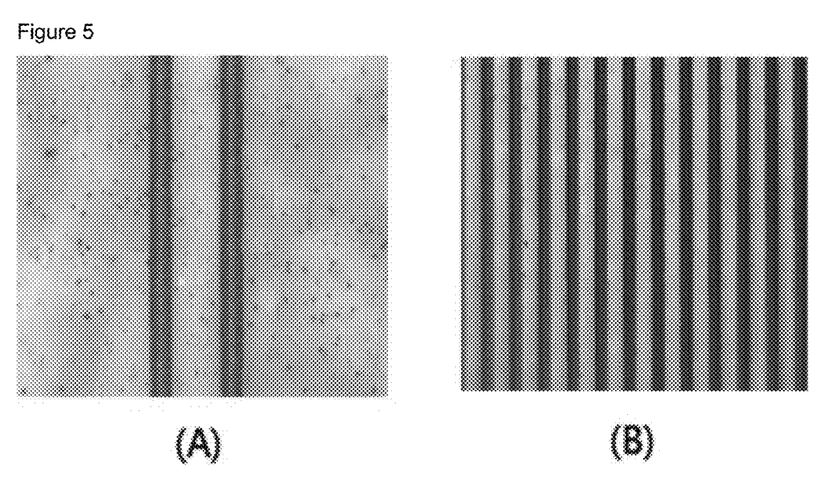
FIG. 5 illustrates patterns measured by an optical microscope, the pattern being formed by inks and paste prepared by a method for preparing carbon-metal composite according to the present invention.

FIG. 5 illustrates patterns measured by an optical microscope, pattern being formed by inks and paste prepared measured with a method for preparing carbon-metal composite according to the present invention, in which (A) indicates the pattern by the ink and (B) indicates the pattern by the paste. The ink or paste manufactured by the method for preparing carbon-metal composite according to the present invention is applied to a printing film such as PET film or polyimide film by using a roll to roll printer capable of patterning, a screen printer or a casting machine used for full coverage coating, in a line width (unit: μm) of interest and then is dried at high temperature, to form patterns in FIG. 5.

The method for preparing carbon-metal composite according to present invention decreases the time for reducing graphene oxide and metal oxide, and also eases the combination of metal with carbon compound selected from a group consisting of graphene and carbon nanotube. The ink or paste manufactured by the method for preparing carbon-metal composite according to present invention can be applied to ESD (electro static discharge) and EMI (electromagnetic interference) shielding, which needs the patterning.

The invention claimed is:

1. A method for preparing carbon-metal composite comprising the steps of:
   reacting a composition containing a carbon compound selected from a group consisting of graphene, graphene oxide and carbon nanotube, a metallic precursor, a reducing agent and a solvent to produce the carbon-metal composite in which the metal of the metallic precursor is bonded to the carbon compound; and
   removing the solvent partially or wholly from the composition which results from the reaction,
   wherein the reducing agent is selected from a group consisting of ethylene glycol, diethylene glycol, 1,2-propylene glycol, triethylene glycol, tetraethylene glycol, 1,3-propylene glycol, glycerol, and mixtures thereof, and
   the metallic precursor includes metal oxide and metallic stearate wherein the step of reacting includes heating at a range of 100° C.–180° C.

2. The method of claim 1, wherein the amount of the carbon compound is 0.01 to 50 wt %, the amount of the metallic precursor is 0.01 to 50 wt the amount of the reducing agent is 0.5 to 20 wt % and the amount of the solve 99 wt % with respect to the total composition.

3. The method of claim 2, further comprising 0.05 to 20 wt % of a dispersing agent or a surface active agent with respect to total composition.

4. The method of claim 1, wherein the metal oxide is silver oxide (Ag$_2$O) and the metallic stearate is selected from a group consisting of zinc stearate, aluminium stearate and magnesium stearate, and mixtures thereof.

5. The method of claim 1, wherein the metal oxide is silver oxide and the reducing agent is triethylene glycol.

6. The method of claim 5, further comprising metal oxide other than silver oxide or metallic stearate, as the metallic precursor.

7. The method of claim 6, wherein the amount of metal oxide other than silver oxide or metallic stearate is 0.05 to 10 parts by weight with respect to 100 parts by weight of total metallic precursor.

8. The method of claim 1, wherein the solvent is selected from a group consisting of methanol, ethanol, isopropyl alcohol, isobutyl alcohol, benzene, toluene, cyclohexane, acetone, methyl ethyl ketone, diethyl ketone, methyl isobutyl ketone, diethyl ether, petroleum ether, tetra-butyl methyl ether, tetrahydrofuran, N-methylpyrrolidone, dimethylformamide, ethyl acetate, benzyl acetate, dimethoxyethane, 1-chlorobutane, ethyl cellosolve acetate, butyl cellosolve acetate, water and mixtures thereof.

9. The method of claim 1, wherein the step of reacting the composition includes a step of firstly reacting the carbon compound, the reducing agent, and the solvent, a step of then adding the metallic precursor, and a step of heating and stirring the composition.

10. The method of claim 1, further comprising a step of drying the composition to manufacture the carbon-metal composite in powder form, after the step of removing the solvent.

11. The method of claim 1, wherein the composition further comprises a binder, and the carbon-metal composite is in form of an ink or a paste.

12. The method of claim 11, wherein the binder is selected from a group consisting of epoxy, polyester, polyvinyl, polyurethane, ethylene vinyl acetate, melamine and mixtures thereof.

13. The method of claim 1, wherein the solvent is wholly removed from the composition to produce the carbon-metal composite in powder form.

* * * * *